(12) United States Patent
Bye

(10) Patent No.: US 6,957,073 B2
(45) Date of Patent: Oct. 18, 2005

(54) MOBILE LOCATION EXPLORER AND METHODS THEREFOR

(75) Inventor: Roger Bye, Lindenhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/246,222

(22) Filed: Sep. 18, 2002

(65) Prior Publication Data

US 2004/0053625 A1 Mar. 18, 2004

(51) Int. Cl.⁷ ............................................. H04Q 7/20
(52) U.S. Cl. ..................... 455/456.1; 455/456.2; 455/457; 455/404.2; 455/466; 455/566; 455/461; 340/995; 340/990; 370/310.2; 370/335; 370/441
(58) Field of Search .................. 455/456, 457, 455/566, 461, 466, 456.1, 456.2, 422.1, 404.2; 340/905, 988, 990, 995, 488, 491; 370/331, 370/330, 335, 310.2

(56) References Cited

U.S. PATENT DOCUMENTS

| | | | |
|---|---|---|---|
| 5,920,820 A * | 7/1999 | Qureshi et al. ............. 455/461 |
| 6,133,853 A * | 10/2000 | Obradovich et al. ........ 340/905 |
| 6,148,261 A * | 11/2000 | Obradovich et al. ........ 701/208 |
| 6,212,470 B1 * | 4/2001 | Seymour et al. .......... 340/995.2 |
| 6,345,043 B1 * | 2/2002 | Hsu ........................... 370/324 |
| 6,515,595 B1 * | 2/2003 | Obradovich et al. ........ 340/905 |
| 6,525,768 B2 | 2/2003 | Obradovich |
| 6,525,786 B1 * | 2/2003 | Ono ............................. 349/40 |
| 6,529,824 B1 * | 3/2003 | Obradovich et al. ........ 701/208 |
| 6,553,308 B1 * | 4/2003 | Uhlmann et al. ........... 701/208 |
| 6,577,609 B2 * | 6/2003 | Sharony ..................... 370/312 |
| 6,716,101 B1 * | 4/2004 | Meadows et al. ........ 455/456.1 |
| 6,724,382 B2 * | 4/2004 | Kenyon et al. ............. 345/419 |

* cited by examiner

Primary Examiner—Marceau Milord
(74) Attorney, Agent, or Firm—Roland K. Bowler, II

(57) ABSTRACT

A method and a mobile wireless communication device (100) capable of virtual exploration of information associated with a location of the device including a processor (110) coupled to the location determining means, a display (130) coupled to the processor, a processor executable application stored in memory (120), the application programming the processor to display information associated with the location of the mobile wireless communication device determined by the location determining means, and the application programming the processor to virtually navigate the information associated with the location of the mobile wireless communication device based on input at the user input (140).

23 Claims, 3 Drawing Sheets

MOBILE LOCATION EXPLORER AND METHODS THEREFOR

FIELD OF THE INVENTIONS

The present inventions relate generally to location enabled mobile wireless devices, and more particularly to location-based exploration in mobile electronic devices, for example in satellite positioning system (SPS) enabled cellular communication handsets, location enabled mobile wireless receivers, exploration applications and methods therefor.

BACKGROUND OF THE INVENTIONS

Location-based routing and planning applications are known generally. These applications enable users to navigate from the user's present location to a distance location specified by the user. See, for example, U.S. Pat. No. 6,212,470 issued on Apr. 3, 2001 and entitled "Driver Preference Responsive Vehicle Route Guidance System", which is assigned commonly with the present application.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

The invention pertains to mobile electronic devices capable of enabling a user to explore information relative to a location of the mobile device. In some embodiments, the mobile devices include satellite-positioning system (SPS) receivers, for example global positioning system (GPS) enabled mobile wireless communication cellular handsets, and other mobile electronics devices with SPS receivers, which determine the physical location of the device. In other embodiments, the location of the mobile device may be determined by other means, examples of which are discussed more fully below.

Figure 1:
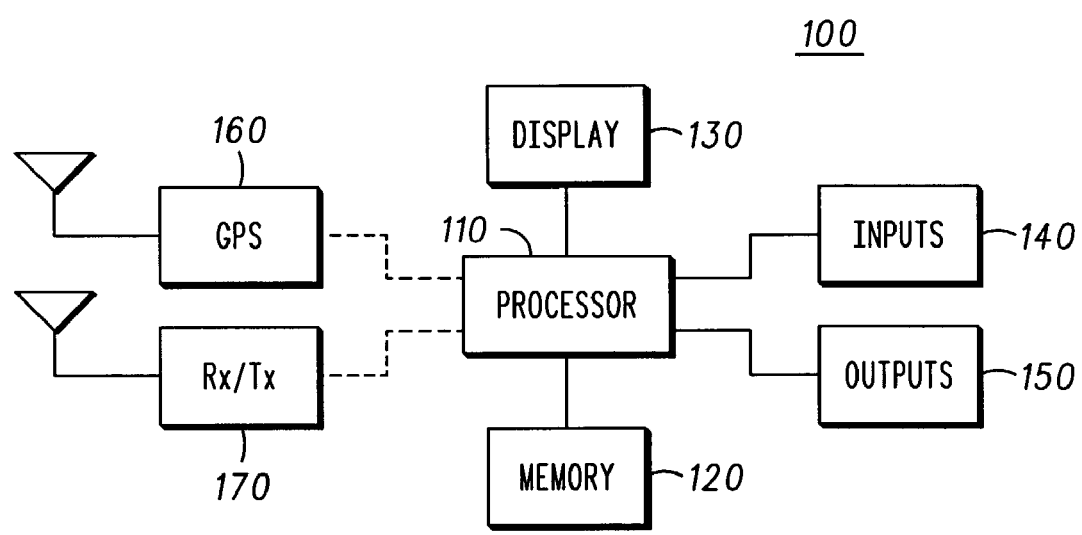
FIG. 1 is schematic block diagram of a location enabled mobile wireless device.

FIG. 1 is an exemplary mobile electronics device 100 comprising generally a processor 110 coupled to memory 120, a display 130 and user inputs 140, for example a scrolling device or a joystick, a keypad with hard and soft keys, possibly a microphone, etc. In some embodiments, there may also be outputs 150, for example a speaker and/or vibrator, and audio and other signal outputs, coupled to the processor 110 and other circuits. The particular inputs and outputs depend generally upon the particular embodiment and device application.

Figure 2:
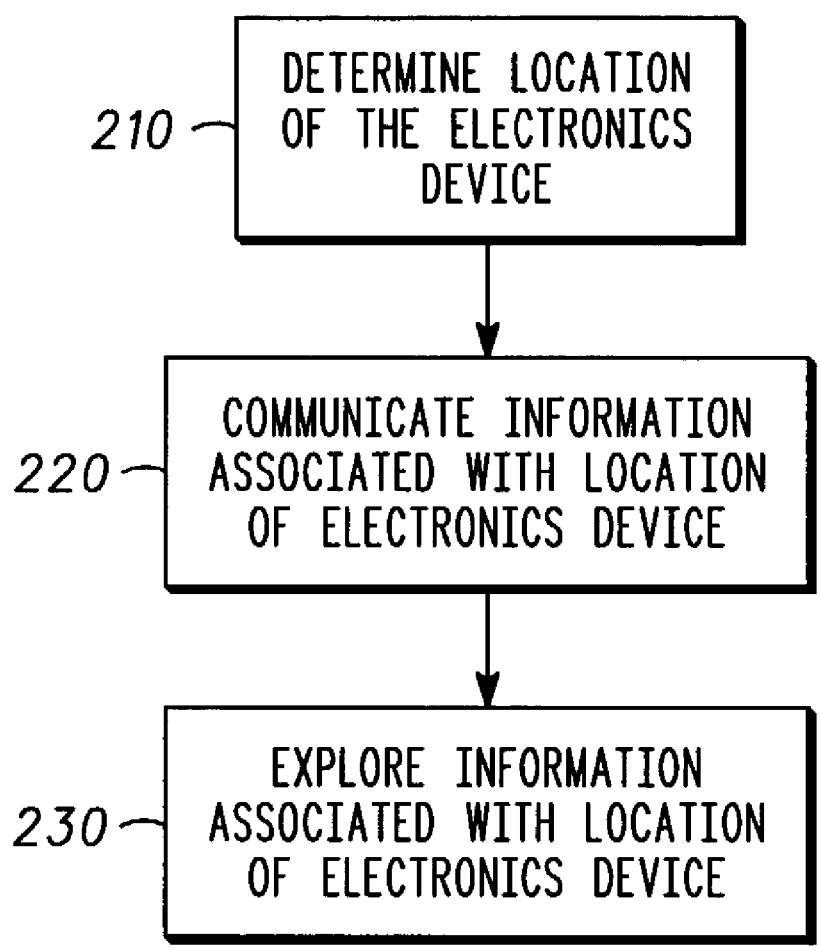
FIG. 2 is process flow diagram for exploring areas neighboring a location of a mobile electronics device.

In the process diagram 200 of FIG. 2, at block 210, a location of the electronics device is determined. In one mode of operation, the position or location of the mobile electronic device is computed on or by the device. In another mode of operation, the location of the device is determined at a distant location and communicated to the device via one or more radio signals from one or more distant locations, for example, from communication network base stations. Alternatively, the location of the device may be received by the device over an Internet connection or some other radio interface, for example, Bluetooth, IEEE 802.11b, etc. In another mode of operation, the position of the mobile device is be manually entered or input to the device by a user thereof.

In one embodiment, in FIG. 1, the mobile electronic device includes an SPS receiver 160, for example, a GPS receiver, for receiving satellite signals from a constellation of earth orbiting satellites from which a present position of the mobile device 100 may be determined. In embodiments that include an SPS receiver, the position of the electronics device may be computed autonomously at the mobile device by processing signals received directly from the satellite.

In the exemplary embodiment of FIG. 1, the mobile device 100 also includes a radio communication transceiver 170, for example, a wideband code division multiple access (W-CDMA) Universal Mobile Telecommunication Services (UMTS) capable transceiver, or a Groupe Special Mobile services (GSM)/Generalized Packet Radio Services (GPRS) transceiver, or some other cellular communications transceiver.

In some embodiments, the mobile device includes a non-cellular communication transceiver, for example, a Bluetooth or IEEE 802.11b transceiver, either alone or in combination with a cellular transceiver. In FIG. 1, the transceiver 170 represents both cellular and non-cellular transceivers. In other embodiments, the mobile device 100 includes an RF receiver for receiving radio signals from a source other than satellites of an SPS, without the ability to transmit.

In embodiments where the mobile electronic device includes a radio frequency (RF) receiver and an SPS receiver, the position of the mobile device may be computed with assistance information received from or provided by the radio receiver. Schemes for sending SPS assistance information to GPS enabled mobile handsets from cellular communication networks are known generally. SPS assistance information includes, for example, precise time or frequency information, and GPS almanac and ephemeris data, etc. It is also known to provide SPS assistance information to mobile devices from non-cellular network transmitters, for example, to provide precise time and frequency information, which may be used to reduce the time required to make SPS based location computations.

In embodiments where the mobile electronics device includes an RF transceiver that communicates in a cellular communication network, the location of the mobile device may also be determined based upon terrestrial information. For example, the network may compute the location of the device and transmit it to the mobile device, or the network may transmit information to the mobile device from which the device may compute is its location. Network based location computation schemes include time difference of arrival (TOA), enhanced observed time of arrival (E-OTD), angle of arrival (ATA) schemes, among others, none of which are intended to limit the types of terrestrial location determinations that may be made.

In other embodiments, the present or actual location of the mobile device may be determined from a hybrid location determination scheme based upon a fusion of both SPS and terrestrial location information. Hybrid location determination schemes are known, and the inventions are not to be limited by any particular scheme.

In FIG. 2, at block 220, information associated with a location of the mobile electronics device is communicated to the user of the device. In some embodiments, the location information is the actual present location of the mobile device. In other embodiments, location information is a recent past location of the mobile device. Recent past location information may be stored on the device or obtained from some other source, for example, from a cellular communication network server. Recent past location information for the device may not be the actual present location of the device, but this information may nevertheless be used when actual present location is unavailable.

In one embodiment, the information associated with the location of the mobile wireless communication device is communicated visually, for example, by displaying a map or other information associated with the location of the device. In other embodiments, the information may be communicated audibly and/or visually to the user of the device.

In embodiments where the information associated with the location of the device is a map, the map may include the location of the device and areas neighboring or surrounding the location of the device. In other embodiments, the map displayed does not include the location of the device, for example, the map displayed may be a map of a distant area selected based upon a predetermined association of the map with the location. Associations of this type are applicable to games and to other applications. The association between the information and the location of the device may be mapped in a table or a database stored either on the device or at a distance location, for example on a network server, which provides the information to the mobile device on demand.

In one embodiment, the location computed is the actual present location of the mobile device, as discussed above, and the actual location is used as the basis or reference for communicating information associated therewith to the user. In one embodiment, for example, information regarding the location of the mobile device is used by an application running on the device as the reference location for communicating information associated with the location of the device. In some instances, the application may require device location information when the application is first opened. In other instances the user may elect to change or update location information provided to the application, for example, as a step in the playing of a game application running on the device.

Location information may be communicated to or input to the application in many ways. In one mode of operation, the application prompts the user for location data input or it prompts the user to identify a source from which location information may be obtained. In another mode of operation, the application prompts the determination of the present location of the device, for example, by initiating the computation of a location fix, which may be based on SPS information or network information or both. In another mode of operation, the application uses a recent location fix stored previously on the device.

Figure 3:
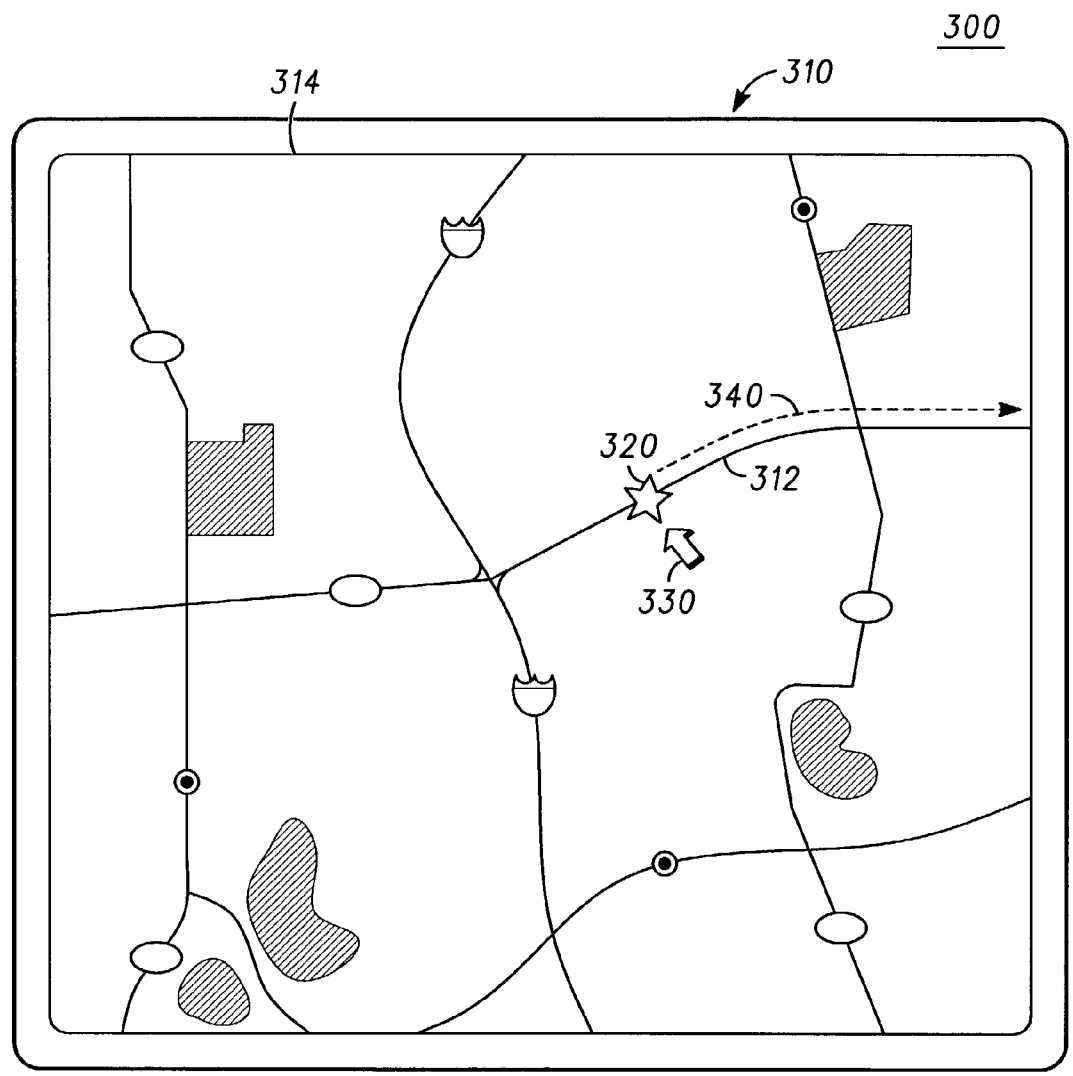
FIG. 3 is exemplary information displayed on a mobile electronic device and associated, wherein the information is associated with a location of the mobile device.

FIG. 3 illustrates a mobile device display 300 with an exemplary area map 310 in a region including the location 320 of the mobile device. In this exemplary illustration, a location fix was determined when the device was physically located at location 320 on the map. As noted above, in other embodiments, the displayed map may not necessarily be of an area that includes the location of the device, but may instead be some other area or information previously associated to the location of the device.

The street map of FIG. 3 is only exemplary. In other embodiments, other types of maps or information may be displayed, for example, that of a university or other campus, a sprawling industrial complex, a large airport terminal, etc. The map may also be of a more localized area, for example, the map of a building, like a government building, or a mall or shopping center, or a particular store, or a library, and the like. In these smaller areas, the mobile device may obtain location information from localized transmitters, for example, from Bluetooth transmitters. In other embodiments, the map may be a scene or environment of a video game or other application. The exemplary map is 2-dimensional, although in other embodiments it may have additional dimensions, spatial or otherwise.

In FIG. 2, at block 230, the user explores the information associated with the location of the mobile device, for example, the user navigates the displayed area in the neighborhood of the location by manipulating a user input of the mobile device. In one embodiment, the user is able to explore the information without physically moving the mobile electronics device. In another embodiment, the user is able to explore the information independent of any physical movement of the mobile electronics device from the original location. Under these exemplary modes of operation, the mobile device may be considered to be in an exploration mode, wherein the displayed area or information will be unaffected by any changes in location of the device, unless or until the application or the user updates the location data, whereupon the displayed area or information is changed accordingly.

In a preferred embodiment, exploration is relative to a actual present or past location of the mobile device. Thus upon producing the map of the area of the location of the device, for example, all exploration is relative to that location. New information, like a new map, is displayed by inputting new or updated location information into the application, for example by physically moving the mobile device and re-computing its new location.

In one embodiment, the reference location used by the application is updated by switching from the explore mode to a location mode whereupon a new location of the device is determined, for example upon moving the device to a new location. Alternatively, the reference location may be updated by making some other selection in the application that will update the location information without the need for changing between explore and locate modes, for example the application may include an update location information input or selection in which the user manually inputs location information, which may or may not have any relation to the physical location of the device. The application will preferably update the location data based on an present location of the mobile device.

In some embodiments, the user has control over when the update occurs. Switching between location mode and explore mode is one way to enable the user to control when the update occurs. An alternative to changing the operating modes, is to provide in the application an update location information user selection, which the user may select when it is desired to update the location information.

In embodiments where the information associated with the actual or present location of the mobile electronics device is communicated to the user of the device by displaying a map or region in the neighborhood of the actual location of the electronics device, the user may explore the area beyond the actual location by moving a cursor about the map region displayed on the mobile wireless communication device.

In FIG. 3, for example, the user may move the cursor 330 along the path of arrow 340 to explore and discover what is along the route or road 312. In other embodiments, the user may explore the map by operating a scrolling device or other input without the benefit of the visual cursor 330. In one embodiment, continued movement the input device, with or without the cursor, in the direction of arrow 340 against the display edge 314, where the road 312 ends, causes the displayed map to scroll left, thereby displaying portions on the right side of the map not displayed in FIG. 3. Other portions of the map may be scrolled onto the display by moving the cursor or input device in other directions.

In games and in other applications, the user may explore other areas, for example, enter rooms, move up and down stairs, etc., by moving the scrolling or other input device about the displayed image. In one embodiment, an avatar, which is representative of a game participant, is moved about the map by providing input to a positioning or scrolling device.

In one embodiment, when the application running on the mobile device is in location mode, as the user physically moves the mobile device, for example, then the avatar moves along the map in the same direction as the device. Thus there is correspondence between where the avatar is located on the map and the physical location of the mobile device. In location mode, an input at the cursor will have no effect on the location of the avatar.

When the application is in exploration mode, as the user scrolls up with the input device, the avatar moves up correspondingly on the map. IN exploration mode, there is no correspondence between the location of the avatar and changes in the physical location of the mobile device.

In another example, a user walking down a corridor comes to a T-junction. The user decides to walk to the right, but wonders what would have been available to the left. With the present invention, the user may explore the left corridor by moving the cursor in explore mode, while the user physically explores right corridor.

While the present inventions and what are considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a mobile wireless communication device, comprising:
    determining a location of the mobile wireless communication device;
    displaying a region in a neighborhood of the location of the mobile wireless communication device;
    exploring the region in the neighborhood of the location of the mobile wireless communication device by navigating the region displayed.

2. The method of claim 1, displaying the region in the neighborhood of the location of the mobile wireless communication device by displaying a map of the neighborhood of the location.

3. The method of claim 2, exploring the region by exploring the map of the neighborhood of the location.

4. The method of claim 1, exploring the region in the neighborhood of the mobile wireless communication device without physically moving the mobile wireless communication device.

5. The method of claim 1, navigating the region by moving a cursor about the region displayed on the mobile wireless communication device.

6. The method of claim 1, exploring the region displayed independent of any change in location of the mobile wireless communication device subsequent to determining the location of the mobile wireless communication device.

7. The method of claim 6, exploring the region independent of any change in location of the mobile wireless communication device in a exploration mode of the mobile wireless communication device.

8. A method in a location enabled mobile electronics device, comprising:
    determining a present location of the location enabled mobile electronics device;
    exploring a virtual area surrounding the present location of the location enabled mobile electronics device without physically moving the location enabled mobile electronics device.

9. The method of claim 8,
    displaying a map including a position corresponding to the present location of the location enabled mobile electronics device,
    exploring the virtual area surrounding the present location of the location enabled mobile electronics device by moving a cursor about the map relative to the position on the map corresponding to the present location of the location enabled mobile electronics device independent of any change in the present location of the location enabled mobile electronics device subsequent to determining the present location of the location enabled mobile electronics device.

10. A method in a mobile electronics device, comprising:
    receiving information of a present location of the mobile electronics device;
    exploring a virtual area surrounding the present location of the mobile electronics device without physically moving the mobile electronics device.

11. The method of claim 10,
    displaying a map including a position corresponding to the present location of the mobile electronics device,
    exploring the virtual area surrounding the present location of the mobile electronics device by moving a cursor about the map relative to the position on the map corresponding to the present location of the mobile electronics device independent of any change in the present location of the mobile electronics device subsequent to determining the present location of the mobile electronics device.

12. The method of claim 10, the mobile electronics device is a wireless cellular communication handset, receiving the information of the present location in a radio signal from a distant source.

13. A method in a mobile wireless communication device, comprising:
    determining a present location of the mobile wireless communication device;
    communicating information associated with the present location of the mobile wireless communication device;
    navigating the information associated with the present location independent of any subsequent change in the location of the mobile wireless communication device.

14. The method of claim 13, communicating the information associated with the present location of the mobile wireless communication device visually by displaying a map of a neighborhood of the present location.

15. The method of claim 14, navigating the information associated with the present location of the mobile wireless communication device by navigating the map of the neighborhood of the present location.

16. The method of claim 13,
communicating the information associated with the present location of the mobile wireless communication device and navigating the information independent of any subsequent change in location of the mobile wireless communication device in an application running on the mobile wireless communication device.

17. The method of claim 13, navigating the information independent of any change in location of the mobile wireless communication device in a navigation mode.

18. The method of claim 13, communicating the information and virtually navigating the information independent of subsequent changes in the actual location of the mobile wireless communication device in a navigation mode.

19. The method of claim 18, determining a subsequent location of the mobile wireless communication device and communicating subsequent information associated with the subsequent location of the mobile wireless communication device in the navigation mode.

20. A mobile wireless communication device, comprising:
location determining means for determining a location of the mobile wireless communication device;
a processor coupled to the location determining means;
a display coupled to the processor;
a user input coupled to the processor;
memory coupled to the processor
a processor executable application stored in memory,
the application programming the processor to display information associated with the location of the mobile wireless communication device determined by the location determining means,
the application programming the processor to virtually navigate the information associated with the location of the mobile wireless communication device based on input at the user input.

21. The mobile wireless communication device of claim 20, the application is a game.

22. The mobile wireless communication device of claim 20, the means for determining the location of the mobile wireless communication device is a satellite positioning system receiver.

23. The mobile wireless communication device of claim 20, the application is a map application, the information associated with the present location of the mobile wireless communication device is a map of an area neighboring the location of the mobile wireless communication device.

* * * * *